(12) United States Patent
Angyal et al.

(10) Patent No.: US 12,157,439 B2
(45) Date of Patent: Dec. 3, 2024

(54) WIPER BLADE, IN PARTICULAR FOR A MOTOR VEHICLE

(71) Applicant: Robert Bosch GmbH, Stuttgart (DE)

(72) Inventors: Adam Angyal, Budapest (HU);
Christian Wilms, Beringen-Koersel (BE); Marcel Ekermans, Sittard (NL);
Marcello Bubba, Linden (BE);
Nicolaas Gotzen, Kortenberg (BE);
Peter Kuypers, Tongeren (BE);
Thomas Belmans, Beringen (BE);
Wim Buseyne, Hasselt (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/078,141

(22) Filed: Dec. 9, 2022

(65) Prior Publication Data

US 2023/0182688 A1    Jun. 15, 2023

(30) Foreign Application Priority Data

Dec. 10, 2021   (DE) .......................... 102021214106.4

(51) Int. Cl.
*B60S 1/38* (2006.01)
(52) U.S. Cl.
CPC ............... *B60S 1/3879* (2013.01); *B60S 1/38* (2013.01); *B60S 2001/3827* (2013.01); *B60S 2001/3836* (2013.01)
(58) Field of Classification Search
CPC .......... B60S 1/38; B60S 1/3879; B60S 1/546; B60S 1/524; B60S 2001/3836; B60S 2001/3827

USPC .......................................... 15/250.48, 250.04
See application file for complete search history.

(56) References Cited

U.S. PATENT DOCUMENTS

| | | | |
|---|---|---|---|
| 2,782,444 A | | 2/1957 | Krohm |
| 3,566,432 A | * | 3/1971 | Quinlan et al. ........... B60S 1/38 15/250.41 |
| 3,881,212 A | | 5/1975 | Regler |
| 5,251,357 A | * | 10/1993 | Jang ......................... B60S 1/38 15/250.4 |
| 5,383,247 A | | 1/1995 | Nickel |

(Continued)

FOREIGN PATENT DOCUMENTS

| | | |
|---|---|---|
| DE | 19745006 A1 | 4/1999 |
| DE | 19745686 * | 4/1999 |

(Continued)

OTHER PUBLICATIONS

Machine translation of description portion of German publication 102005054142, published May 2007. (Year: 2007).*

(Continued)

*Primary Examiner* — Gary K. Graham
(74) *Attorney, Agent, or Firm* — Michael Best & Friedrich LLP

(57) ABSTRACT

A wiper blade (10), in particular for a motor vehicle, is proposed with a wiping strip (16) mounted between a first spring bar portion (34) and a second spring bar portion (36) by a fastening portion (24) and having a substantially triangular lip portion (18). According to the invention, between the fastening portion (24) and the lip portion (18), a cavity portion (22) is provided, on which dampening means (52) are provided, in particular fastened thereto or formed in one piece therewith.

19 Claims, 3 Drawing Sheets

(56) References Cited

U.S. PATENT DOCUMENTS

| | | | |
|---|---|---|---|
| 5,784,751 A | | 7/1998 | Tippets |
| 6,115,876 A | * | 9/2000 | Zimmer .............. B60S 1/3801 |
| | | | 15/250.48 |
| 8,826,485 B2 | | 9/2014 | Boland |
| 9,463,779 B2 | | 10/2016 | Gross et al. |
| 2020/0324736 A1 | | 10/2020 | Steiner et al. |
| 2020/0391700 A1 | | 12/2020 | Angyal et al. |
| 2023/0182687 A1 | | 6/2023 | Angyal et al. |

FOREIGN PATENT DOCUMENTS

| | | | | |
|---|---|---|---|---|
| DE | 19524108 | | * | 1/2007 |
| DE | 102005054142 | | * | 5/2007 |
| DE | 102019214976 | A1 | | 4/2021 |
| EP | 0506541 | A1 | | 9/1992 |
| FR | 2869278 | | * | 10/2005 |
| GB | 707559 | | * | 4/1954 |
| GB | 2254543 | A | | 10/1992 |
| WO | 2009/007647 | | * | 1/2009 |
| WO | 2014/177219 | | * | 11/2014 |
| WO | 2019/105648 | | * | 6/2019 |

OTHER PUBLICATIONS

Machine translation of description portion of German publication 102019214976, published 2021. (Year: 2021).*
United States Patent Office Non-final Action for U.S. Appl. No. 18/078,139 dated Mar. 30, 2023 (11 pages).
United States Patent Office Non-final Action for U.S. Appl. No. 18/078,139 dated Feb. 15, 2024 (10 pages).

* cited by examiner

WIPER BLADE, IN PARTICULAR FOR A MOTOR VEHICLE

BACKGROUND OF THE INVENTION

The invention relates to a wiper blade, in particular for a motor vehicle.

Some wiper blades with a wiping strip, which is mounted between a first spring bar portion and a second spring bar portion by a fastening portion, which essentially comprises a triangular lip portion having a plurality of parallel incisions, are already known.

For example, DE 10 2019 214 976 A1 shows such a wiper blade.

SUMMARY OF THE INVENTION

The wiper blade according to the invention has the advantage that a cavity portion is provided between the fastening portion and the lip portion. This achieves a better wiping result without increasing the cost of the wiper blade.

It is advantageous for a first tilt bar to be provided between the lip portion and the cavity portion since this allows the wiper lip to slide cleanly over the windshield.

An advantageously simple embodiment is given in that on its side facing the cavity portion, the cavity portion is significantly wider than the lip portion. This is particularly favorable when extruding the wiping strip.

Advantageously, a simple and inexpensive embodiment results in the cavity portion being substantially rectangular in cross-section.

Furthermore, it is to be considered advantageous if the fastening portion is substantially T-shaped since the wiping strip is securely mounted as a result thereof.

In a further advantageous development of the invention, the first and/or second spring bar portion is arranged between the cavity portion and an upper bar of the fastening portion since the wiping strip is securely mounted in this way.

It is furthermore advantageous if the lip portion is symmetrically formed in cross-section and has exactly two incisions on each side. Extensive experiments have shown that this achieves a particularly good wiping result.

It is particularly advantageous in this case if further tilt bars, in particular two, preferably precisely two, tilt bars, are formed by the incisions since this further improves the wiping pattern.

In this case, it is particularly advantageous for the first tilt bar to have a first width and for one of the further tilt bars to have a second width and for the second width to be equal to or smaller than the first width.

In a particularly favorable and therefore advantageous embodiment, the incisions have a cut width of less than 1 mm, in particular less than 0.8 mm, preferably less than 0.5 mm.

BRIEF DESCRIPTION OF THE DRAWINGS

One exemplary embodiment of the invention is shown in more detail in the drawings and in the following description. Shown are.

DETAILED DESCRIPTION

Figure 1:
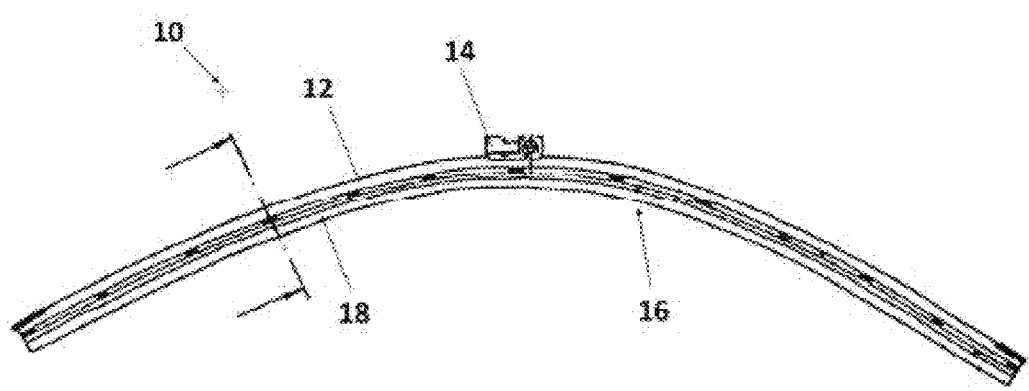
FIG. 1 shows a wiper blade according to the invention in a schematic side view, FIG. 2 a cross-section through a wiping strip of a wiper blade, and FIG. 3 a cross-section through a wiping strip of a wiper blade according to the invention.
Figure 2:
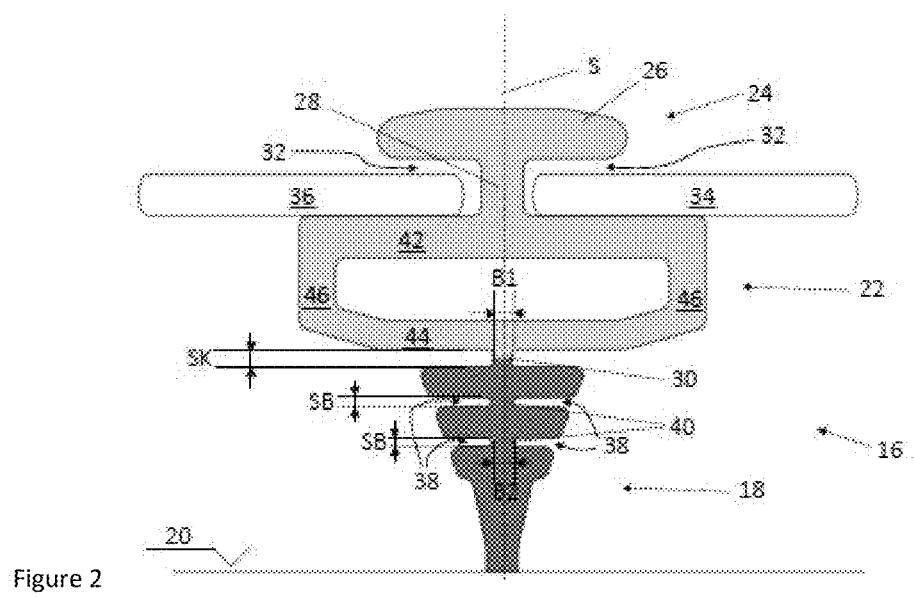

In FIG. 1, a wiper blade 10 according to the invention is shown in a schematic side view. Said wiper blade comprises a spring bar 12 to which is fastened a fastening means 14 for fastening to a wiper arm that is not drawn here for reasons of clarity. On the spring bar 12, on a side facing away from the fastening means 14, a wiping strip 16 is arranged, which, on its side facing away from the spring bar, 12 supports a lip portion 18, which in operation can remove moisture from a windshield 20 (FIG. 2). The wiper blade 10 has a longitudinal extension, wherein the fastening means 14 is arranged approximately centrally of the longitudinal extension. End caps (not denoted in more detail) are arranged at the ends of the longitudinal extension.

FIG. 2 shows a cross-section through the wiping strip 16 of the wiper blade 10 according to the invention. The wiping strip 16 is formed mirror-symmetrically around an imaginary axis of symmetry S. In the mounted position, the wiping strip 16, more precisely the lip portion 18 of the wiping strip 16, rests on the windshield 20 in order to remove moisture from it.

The wiping strip 16 has a substantially three-part structure. A cavity portion 22 is provided above the lip portion 18. A fastening portion 24 adjoins the cavity portion 22. The fastening portion 24 is T-shaped and therefore comprises a horizontal upper bar 26 as well as a perpendicular base 28. Lip portion 18 and cavity portion 22 are connected via a first tilt bar 30. This first tilt bar 30 has a first width B1. The first tilt bar height SK corresponds to the height of the first tilt bar 30 and measures approximately 0.6 mm.

As a result, a retaining groove 32 is respectively formed on the left and right in cross-section by the base 28, which adjoins the cavity portion 22 and the upper bar 26. The one retaining groove 32 holds a first spring bar portion 34 and the other retaining groove 32 holds a second spring bar portion 36. The length of the base 28 approximately corresponds to the thickness of the first spring bar portion 34 or of the second spring bar portion 36 so that the wiping strip 16 is securely mounted between the first spring bar portion 34 and the second spring bar portion 36 in the vertical direction.

The lip portion 18 has two incisions 38 each on the left and right in cross-section. Each incision 38 extends horizontally and is spaced apart from the axis of symmetry S. Thus, due to the depth of the incisions 38, further tilt bars 40 are created that have a second width B2.

The incisions 38 here have a cut width SB of approximately 0.4 mm. This results in a second tilt bar height corresponding to the cut width SB.

The cavity portion 22 is of substantially rectangular shape and is formed to be hollow in its interior. Thus, the cavity portion 22 comprises an upper wall 42, on which the base 28 is arranged approximately centrally. Furthermore, the cavity portion 22 comprises a lower wall 44, on which the first tilt bar 30 is arranged perpendicularly and approximately centrally. The lower wall 44 is formed somewhat thinner than the upper wall 42 so that it has a higher elasticity. The lower wall 44 is wider in cross-section than the overall width of the lip portion 18. In particular, the width of the lower wall 44 is selected such that when the lip portion 18 is tilted around the first tilt bar 30, the lip portion 18 can be supported on the lower wall 44. The side walls 46 arranged between the upper wall 42 and the lower wall 44 are angled so that the lower wall 44 is somewhat narrower in cross-section than the upper wall 42. The overall width of the cavity portion 22 in cross-section is approximately two to four times, preferably two to three times, the largest width of the lip portion 18.

The first width B1 of the first tilt bar 30 is somewhat larger than the second width B2 of the further tilt bars 40. In a variation of the invention, the further tilt bars 40 may also have a different width; in particular, the width of the further tilt bars 40 can gradually decrease starting from the first tilt bar 30. In a further variation of the invention, the cut width SB of the incisions 38 may also be different, in particular gradually increase starting from the first tilt bar 30.

The wiping strip 16 is extruded from EPDM. A co-extrusion process is used; however, alternatively, only a single plastic may also be used. The region of the lip portion 18 is of slightly softer EPDM than the remaining region of the wiping strip 16. For example, the cavity portion 22 has a greater hardness than the lip portion 16. Moreover, the cavity portion 22 has greater damping than the lip portion 16. In a further variation, the fastening portion 24 may also be made of a more rigid plastic so that the wiping strip is extruded from three different plastics.

The cavity of the cavity portion 22 may be formed openly on both sides with respect to the longitudinal extension so that air is located therein. In one variation, the ends of the longitudinal extension of the cavity portion 22 may also be closed, and the cavity may in particular be filled with gas or compressed air.

Figure 3:
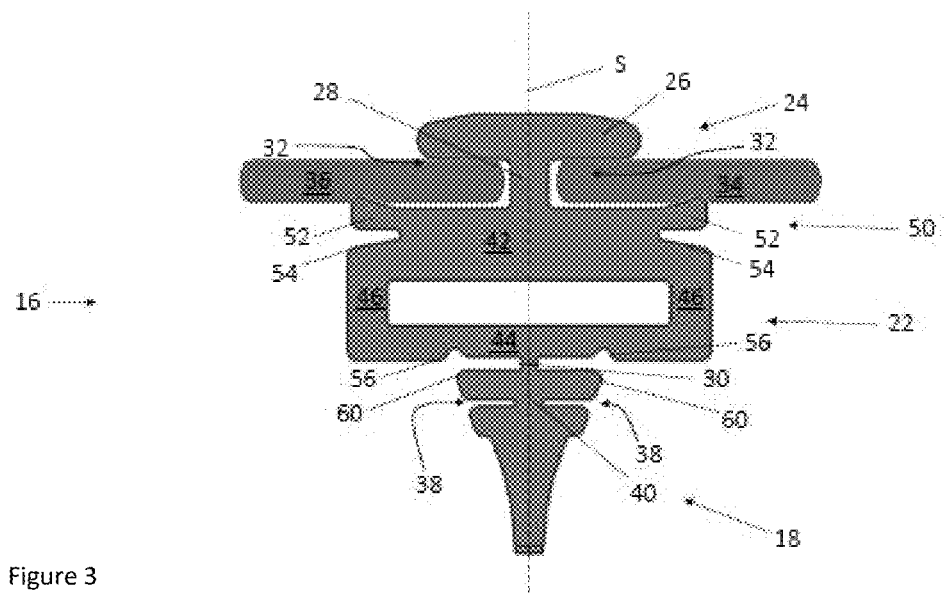

FIG. 3 shows a cross-section through a wiping strip 16 of a wiper blade 10 according to the invention, shown in a variation of the invention. In order to avoid repetitions, only the differences from FIG. 2 are explained. In this respect, the statements regarding FIG. 2 also apply here.

Between the cavity portion 22 and the fastening portion 24, a dampening portion 50 is provided, in which dampening means 52 are arranged. The dampening means 52 are formed as wings or flaps extending with its free end from the upper wall 42 of the cavity portion 22 into the retaining grooves 32. The dampening means 52, i.e., the wings or flaps, are formed in one piece with the cavity portion 22, but the dampening means may also be formed separately and fastened to the cavity portion 22, for example, glued or firmly bonded. In a variation of the invention, the dampening means 52 may also be designed as a layer, in particular a flat layer, that is fastened to the cavity portion 22. A layer of felt or a polymeric foam, for example, is possible here.

The distance between the upper wall 42 of the cavity portion 22 and the upper bar 26 is therefore somewhat larger than in the previous exemplary embodiment, namely significantly larger than the thickness of the first spring bar portion 34 or of the second spring bar portion 36. As shown here, the upper wall 42 of the cavity portion 22 can also have shoulders 54 so that the wings extend approximately horizontally as dampening means 52 and are thickened toward their free end, i.e., have a greater width or height in cross-section. The perpendicular distance between the top end of the dampening means 52 and the bottom plane of the bar 26, i.e., the distance in which the first spring bar portion 34 or the second spring bar portion 36 are inserted, is slightly smaller than the thickness of the spring bar portions 34, 36 so that they are supported in the retaining grooves 32 without play, but resiliently.

The lip portion 18 here has only a single incision 38 on the left and right as seen in cross-section. As a result, only a single further tilt bar 40 is formed in addition to the first tilt bar 30.

Furthermore, one guide shoulder 56 each is arranged in the lower wall 44 of the cavity portion 22 on the left and the right as seen in cross-section. Said guide shoulder is designed as a groove or indentation located on side of the lower wall 44 facing the lip portion 18. The guide shoulder 56 is arranged at the location where the lip portion 18 touches the lower wall 44 of the cavity portion 22 when tilting around the first tilt bar 30. If the lip portion 18 is tilted during a wiping process, the tilt bar 30 tilts accordingly. Since the lip portion 18, which is approximately triangular in cross-section, has an edge 60 on each side, the rear edge 60 of the lip portion 18 in the direction of movement of the wiping strip 16 in the guide shoulder 56 and thereby supports the lip portion 18.

Here, the entire wiping strip 16 is made in one piece of plastic, in particular an elastomer, for example EPDM. The wiping strip 16 may be produced by, for example, extrusion or injection molding. In particular, a plurality of different plastics can be used here, for example by a multi-component extrusion or injection molding process.

What is claimed is:

1. A wiper blade (10), having a wiping strip (16) which is mounted between a first spring bar portion (34) and a second spring bar portion (36) by a fastening portion (24) and comprises a substantially triangular lip portion (18), wherein a cavity portion (22) is provided between the fastening portion (24) and the lip portion (18), wherein a pair of dampening means (52) are arranged on a dampening portion (50) between the cavity portion (22) and the fastening portion (24), wherein each of the dampening means (52) is a wing or flap extending, with a free end, from an upper wall (42) of the cavity portion (22), wherein the upper wall (42) of the cavity portion (22) also includes shoulders (54), wherein the wings or flaps include a first wing or flap positioned above and spaced from a first one of the shoulders (54), and a second wing or flap positioned above and space from a second one of the shoulders (54), wherein each of the wings or flaps thickens moving toward the free end, wherein the fastening portion (24) includes an upper bar (26) in a transverse direction with respect to an axis of symmetry S of the wiper strip, wherein the cavity portion (22) has an outer width that is greater than a width of the upper bar (26), wherein the first wing or flap is separated from the first one of the shoulders (54) by a first groove and the second wing or flap is separated from the second one of the shoulders (54) by a second groove, and wherein a distance between bottoms of the first groove and the second groove is greater than the width of the upper bar (26) in the transverse direction.

2. The wiper blade (10) according to claim 1, wherein the cavity portion (22) is fastened to the dampening means (52).

3. The wiper blade (10) according to claim 1, wherein the cavity portion (22) is formed in one piece with the dampening means (52).

4. The wiper blade (10) according to claim 1, wherein the dampening means (52) mounts the first spring bar portion (34) and the second spring bar portion (36) vertically, without play between the cavity portion (22) and the fastening portion (24).

5. The wiper blade (10) according to claim 1, wherein on its side facing the lip portion (18), the cavity portion (22) is substantially wider than the lip portion (18).

6. The wiper blade (10) according to claim 1, wherein the cavity portion (22) is substantially rectangular in cross-section.

7. The wiper blade (10) according to claim 1, wherein the fastening portion (24) is substantially T-shaped.

8. The wiper blade (10) according to claim 1, wherein the first and/or the second spring bar portion (34, 36) is/are arranged between the cavity portion (22) and the upper bar (26) of the fastening portion (24).

9. The wiper blade (10) according to claim 1, wherein the lip portion (18) is mirror-symmetrically formed in cross-section and has exactly two incisions (38) on each side.

10. The wiper blade (10) according to claim 9, wherein at least one further tilt bar (40) is formed by the incisions (38).

11. The wiper blade (10) according to claim 10, wherein exactly two further tilt bars (40) are formed by the incisions (38).

12. The wiper blade (10) according to claim 11, wherein a first tilt bar (30) has a first width (B1) and at least one of the two further tilt bars (40) has a second width (B2), and the second width (B2) is equal to or smaller than the first width (B1).

13. The wiper blade (10) according to claim 12, wherein each of the two further tilt bars (40) has the second width (B2).

14. The wiper blade (10) according to claim 1, wherein the lip portion (18) has incisions (38), wherein the incisions (38) each have a cut width (SB) of less than 1 millimeter.

15. The wiper blade (10) according to claim 14, wherein the incisions (38) each have a cut width (SB) of less than 0.5 millimeter.

16. The wiper blade (10) according to claim 1, wherein the wiper blade is a motor vehicle wiper blade (10).

17. The wiper blade (10) according to claim 1, wherein a distance between the first one of the shoulders (54) and the second one of the shoulders (54) is greater than the width of the upper bar (26).

18. The wiper blade (10) according to claim 1, wherein the first groove is a tapering channel which narrows moving inwardly toward the axis of symmetry S of the wiping strip (16).

19. The wiper blade (10) according to claim 1, wherein the cavity portion (22) defines an inner cavity having a width that is also greater than the width of the upper bar (26).

* * * * *